United States Patent
Greenbaum et al.

(10) Patent No.: US 12,544,129 B2
(45) Date of Patent: Feb. 10, 2026

(54) BIPOLAR ELECTRODE PAIR SELECTION

(71) Applicant: BIOSENSE WEBSTER (ISRAEL) LTD., Yokneam (IL)

(72) Inventors: Lior Greenbaum, Zoran (IL); Jonathan Yarnitsky, Haifa (IL); Elad Nakar, Timrat (IL); Dan Sztejnberg, Hertzilya (IL); Guy Wekselman, Tel Aviv (IL)

(73) Assignee: BIOSENSE WEBSTER (ISRAEL) LTD., Yokneam (IL)

( * ) Notice: Subject to any disclaimer, the term of this patent is extended or adjusted under 35 U.S.C. 154(b) by 223 days.

(21) Appl. No.: 17/341,315

(22) Filed: Jun. 7, 2021

(65) Prior Publication Data

US 2022/0387100 A1  Dec. 8, 2022

(51) Int. Cl.
    *A61B 18/14*    (2006.01)
    *A61B 18/00*    (2006.01)
    *A61B 18/12*    (2006.01)

(52) U.S. Cl.
    CPC .............. *A61B 18/1492* (2013.01); *A61B 2018/00351* (2013.01); *A61B 2018/1253* (2013.01); *A61B 2018/126* (2013.01)

(58) Field of Classification Search
    CPC ........... A61B 18/1492; A61B 18/12; A61B 2018/126; A61B 2018/00351; A61B 2018/00577; A61B 2018/00839; A61B 2018/1253; A61B 2018/00702; A61B 2018/1467; A61B 5/367; A61B 5/343; A61B 5/72; A61B 5/062; A61B 5/287; A61B 5/318; A61B 5/282; A61B 5/6852; A61B 5/346; A61B 5/6858; A61B 5/6859;

(Continued)

(56) References Cited

U.S. PATENT DOCUMENTS

| 5,391,199 A | 2/1995 | Ben Haim |
|---|---|---|
| 6,239,724 B1 | 5/2001 | Doron |
| 6,332,089 B1 | 12/2001 | Acker |

(Continued)

FOREIGN PATENT DOCUMENTS

| EP | 2627243 A1 | 8/2013 |
|---|---|---|
| EP | 2901923 A1 | 8/2015 |

(Continued)

OTHER PUBLICATIONS

European Search report for corresponding EPA No. 22177351.8 dated Oct. 27, 2022.

*Primary Examiner* — Joseph A Stoklosa
*Assistant Examiner* — Marina Delaney Templeton
(74) *Attorney, Agent, or Firm* — Clayton, McKay & Bailey, PC (57) ABSTRACT

In one embodiment, a medical system includes a catheter configured to be inserted into a chamber of a heart of a living subject, and including multiple electrodes configured to capture electrical activity from electrical activation signals propagating in tissue of the chamber, a display, and processing circuitry configured to automatically select bipolar signals to be captured into an electro-anatomical map from respective electrode pairs of the multiple electrodes responsively to an alignment of the respective electrode pairs with a direction of propagation of the electrical activation signals, and render the electro-anatomical map to the display.

11 Claims, 6 Drawing Sheets

(58) Field of Classification Search
CPC . A61B 5/361; A61B 34/20; A61B 2034/2051; A61B 2017/00053
See application file for complete search history.

(56) References Cited

U.S. PATENT DOCUMENTS

| | | | |
|---|---|---|---|
| 6,484,118 B1 | 11/2002 | Govari | |
| 6,618,612 B1 | 9/2003 | Acker | |
| 6,690,963 B2 | 2/2004 | Ben Haim | |
| 7,756,576 B2 | 7/2010 | Levin | |
| 7,848,787 B2 | 12/2010 | Osadchy | |
| 7,869,865 B2 | 1/2011 | Govari | |
| 2002/0065455 A1 | 5/2002 | Ben Haim | |
| 2003/0120150 A1 | 6/2003 | Govari | |
| 2004/0068178 A1 | 4/2004 | Govari | |
| 2013/0274582 A1* | 10/2013 | Afonso | A61B 5/065 600/374 |
| 2014/0336518 A1 | 11/2014 | Shuros | |
| 2015/0351652 A1* | 12/2015 | Marecki | A61B 18/1492 29/829 |
| 2019/0328258 A1* | 10/2019 | Gaeta | A61B 5/282 |
| 2020/0352465 A1* | 11/2020 | Gaeta | A61B 5/287 |

FOREIGN PATENT DOCUMENTS

| | | |
|---|---|---|
| WO | WO1996005768 A1 | 2/1996 |
| WO | WO2017024107 A1 | 2/2017 |

\* cited by examiner

BIPOLAR ELECTRODE PAIR SELECTION

FIELD OF THE INVENTION

The present invention relates to medical systems, and in particular, but not exclusively to, electro-anatomical mapping.

BACKGROUND

A wide range of medical procedures involve placing probes, such as catheters, within a patient's body. Location sensing systems have been developed for tracking such probes. Magnetic location sensing is one of the methods known in the art. In magnetic location sensing, magnetic field generators are typically placed at known locations external to the patient. A magnetic field sensor within the distal end of the probe generates electrical signals in response to these magnetic fields, which are processed to determine the coordinate locations of the distal end of the probe. These methods and systems are described in U.S. Pat. Nos. 5,391,199, 6,690,963, 6,484,118, 6,239,724, 6,618,612 and 6,332,089, in PCT International Publication No. WO 1996/005768, and in U.S. Patent Application Publications Nos. 2002/0065455 and 2003/0120150 and 2004/0068178, whose disclosures are all incorporated herein by reference. Locations may also be tracked using impedance or current based systems.

One medical procedure in which these types of probes or catheters have proved extremely useful is in the treatment of cardiac arrhythmias. Cardiac arrhythmias and atrial fibrillation in particular, persist as common and dangerous medical ailments, especially in the aging population.

Diagnosis and treatment of cardiac arrhythmias include mapping the electrical properties of heart tissue, especially the endocardium and the heart volume, and selectively ablating cardiac tissue by application of energy. Such ablation can cease or modify the propagation of unwanted electrical signals from one portion of the heart to another. The ablation process destroys the unwanted electrical pathways by formation of non-conducting lesions. Various energy delivery modalities have been disclosed for forming lesions, and include use of microwave, laser and more commonly, radiofrequency energies to create conduction blocks along the cardiac tissue wall. In a two-step procedure, mapping followed by ablation, electrical activity at points within the heart is typically sensed and measured by advancing a catheter containing one or more electrical sensors into the heart, and acquiring data at a multiplicity of points. These data are then utilized to select the endocardial target areas at which the ablation is to be performed.

Electrode catheters have been in common use in medical practice for many years. They are used to stimulate and map electrical activity in the heart and to ablate sites of aberrant electrical activity. In use, the electrode catheter is inserted into a major vein or artery, e.g., femoral artery, and then guided into the chamber of the heart of concern. A typical ablation procedure involves the insertion of a catheter having a one or more electrodes at its distal end into a heart chamber. A reference electrode may be provided, generally taped to the skin of the patient or by means of a second catheter that is positioned in or near the heart. RF (radio frequency) current is applied to the tip electrode(s) of the ablating catheter, and current flows through the media that surrounds it, i.e., blood and tissue, toward the reference electrode. The distribution of current depends on the amount of electrode surface in contact with the tissue as compared to blood, which has a higher conductivity than the tissue. Heating of the tissue occurs due to its electrical resistance. The tissue is heated sufficiently to cause cellular destruction in the cardiac tissue resulting in formation of a lesion within the cardiac tissue which is electrically non-conductive.

SUMMARY

There is provided in accordance with an embodiment of the present disclosure a medical system, including a catheter configured to be inserted into a chamber of a heart of a living subject, and including multiple electrodes configured to capture electrical activity from electrical activation signals propagating in tissue of the chamber, a display, and processing circuitry configured to automatically select bipolar signals to be captured into an electro-anatomical map from respective electrode pairs of the multiple electrodes responsively to an alignment of the respective electrode pairs with a direction of propagation of the electrical activation signals, and render the electro-anatomical map to the display.

Further in accordance with an embodiment of the present disclosure the processing circuitry is configured to receive unipolar signals from respective ones of the multiple electrodes, compute, for the respective electrode pairs, respective time differences between the unipolar signals of the respective electrode pairs, the respective time differences being indicative of respective alignments of the respective electrode pairs with the direction of propagation of the electrical activation signals, and automatically select the bipolar signals to be captured into the electro-anatomical map from the respective electrode pairs responsively to the respective time differences between the unipolar signals of the respective electrode pairs.

Still further in accordance with an embodiment of the present disclosure a first electrode pair of the respective electrode pairs has a first time difference between the unipolar signals of the first electrode pair, a second electrode pair of the respective electrode pairs has a second time difference between the unipolar signals of the second electrode pair, and the processing circuitry is configured to automatically select, for a time period, the bipolar signals to be captured into the electro-anatomical map from the first electrode pair and not from the second electrode pair responsively to the first time difference being greater than the second time difference.

Additionally, in accordance with an embodiment of the present disclosure the catheter includes a plurality of flexible splines, respective groups of the multiple electrodes are disposed on respective ones of the flexible splines, the electrodes of the first electrode pair are disposed on different ones of the flexible splines, and the electrodes of the second electrode pair are disposed on a same one of the flexible splines.

Moreover, in accordance with an embodiment of the present disclosure the catheter includes a plurality of flexible splines, respective groups of the multiple electrodes are disposed on respective ones of the flexible splines, the electrodes of the first electrode pair are disposed on a same one of the flexible splines, and the electrodes of the second electrode pair are disposed on different ones of the flexible splines.

Further in accordance with an embodiment of the present disclosure the processing circuitry is configured to compute respective local activation times for the unipolar signals, and compute, for the respective electrode pairs, the respective time differences between the unipolar signals of the respective electrode pairs responsively to the respective local activation times.

Still further in accordance with an embodiment of the present disclosure the processing circuitry is configured to compute the respective local activation times for the unipolar signals responsively to a respective maximum negative slope of the unipolar signals.

Additionally in accordance with an embodiment of the present disclosure the catheter includes a plurality of flexible splines, respective groups of the multiple electrodes being disposed on respective ones of the flexible splines, and the electrodes of a first electrode pair of the respective electrode pairs providing one of the selected bipolar signals are disposed on different ones of the flexible splines, and the electrodes of a second electrode pair of the respective electrode pairs providing one of the selected bipolar signals are disposed on a same one of the flexible splines.

Moreover, in accordance with an embodiment of the present disclosure the catheter includes a grid-shaped distal end assembly including the flexible splines.

There is also provided in accordance with another embodiment of the present disclosure, a medical method, including automatically selecting bipolar signals to be captured into an electro-anatomical map from respective electrode pairs of multiple electrodes of a catheter inserted into a chamber of a heart of a living subject, responsively to an alignment of the respective electrode pairs with a direction of propagation of electrical activation signals propagating in tissue of the chamber, and rendering the electro-anatomical map to a display.

Further in accordance with an embodiment of the present disclosure, the method includes receiving unipolar signals from respective ones of the multiple electrodes, computing, for the respective electrode pairs, respective time differences between the unipolar signals of the respective electrode pairs, the respective time differences being indicative of respective alignments of the respective electrode pairs with the direction of propagation of the electrical activation signals, and wherein the automatically selecting includes automatically selecting the bipolar signals to be captured into the electro-anatomical map from the respective electrode pairs responsively to the respective time differences between the unipolar signals of the respective electrode pairs.

Still further in accordance with an embodiment of the present disclosure a first electrode pair of the respective electrode pairs has a first time difference between the unipolar signals of the first electrode pair, a second electrode pair of the respective electrode pairs has a second time difference between the unipolar signals of the second electrode pair, and the automatically selecting includes automatically selecting, for a time period, the bipolar signals to be captured into the electro-anatomical map from the first electrode pair and not from the second electrode pair responsively to the first time difference being greater than the second time difference.

Additionally, in accordance with an embodiment of the present disclosure the catheter includes a plurality of flexible splines, respective groups of the multiple electrodes are disposed on respective ones of the flexible splines, the electrodes of the first electrode pair are disposed on different ones of the flexible splines, and the electrodes of the second electrode pair are disposed on a same one of the flexible splines.

Moreover, in accordance with an embodiment of the present disclosure the catheter includes a plurality of flexible splines, respective groups of the multiple electrodes are disposed on respective ones of the flexible splines, the electrodes of the first electrode pair are disposed on a same one of the flexible splines, and the electrodes of the second electrode pair are disposed on different ones of the flexible splines.

Further in accordance with an embodiment of the present disclosure, the method includes computing respective local activation times for the unipolar signals, wherein the computing, for the respective electrode pairs, the respective time differences between the unipolar signals of the respective electrode pairs is performed responsively to the respective local activation times.

Still further in accordance with an embodiment of the present disclosure the computing the respective local activation times for the unipolar signals is performed responsively to a respective maximum negative slope of the unipolar signals.

Additionally in accordance with an embodiment of the present disclosure the catheter includes a plurality of flexible splines, respective groups of the multiple electrodes being disposed on respective ones of the flexible splines, and the electrodes of a first electrode pair of the respective electrode pairs providing one of the selected bipolar signals are disposed on different ones of the flexible splines, and the electrodes of a second electrode pair of the respective electrode pairs providing one of the selected bipolar signals are disposed on a same one of the flexible splines.

Moreover, in accordance with an embodiment of the present disclosure the catheter includes a grid-shaped distal end assembly including the flexible splines.

There is also provided in accordance with still another embodiment of the present disclosure, a software product, including a non-transient computer-readable medium in which program instructions are stored, which instructions, when read by a central processing unit (CPU), cause the CPU to automatically select bipolar signals to be captured into an electro-anatomical map from respective electrode pairs of multiple electrodes of a catheter inserted into a chamber of a heart of a living subject, responsively to an alignment of the respective electrode pairs with a direction of propagation of electrical activation signals propagating in tissue of the chamber, and render the electro-anatomical map to a display.

BRIEF DESCRIPTION OF THE DRAWINGS

The present invention will be understood from the following detailed description, taken in conjunction with the drawings in which.

DESCRIPTION OF EXAMPLE EMBODIMENTS

Overview

As mentioned previously, in a two-step procedure, mapping followed by ablation, electrical activity at points within the heart is typically sensed and measured by advancing a catheter containing multiple electrodes into the heart, and acquiring data at a multiplicity of points. These data are then utilized to generate an electro-anatomical map which is then analyzed to select the target areas at which the ablation is to be performed.

When acquiring bipolar signal measurements into an electro-anatomical map, it is important to select the bipolar signals from electrode pairs which are best aligned with the electrical activation wave propagation direction. For example, some electrode pairs may be better aligned with the wave propagation direction than others. In some cases, an electrode pair may even be perpendicular to the wave propagation direction. Selecting the correct electrode pairs is both time consuming and prone to error if performed manually. In cardiac procedures where time is of the essence and errors may lead to medical problems, or even fatalities, it is important to select, correctly and quickly, the electrode pairs for acquiring bipolar signal measurements into the electro-anatomical map.

Embodiments of the present invention solve the above problems during a medical procedure such as a mapping by automatically selecting bipolar signals to be captured into an electro-anatomical map from a selection of electrode pairs of a catheter responsively to respective alignments of respective ones of the electrode pairs with a direction of propagation of the electrical activation signals.

In some embodiments, the alignment of the electrode pairs with the direction of propagation of the electrical activation signals may be analyzed using unipolar signals from the individual electrodes of the electrode pairs. The time difference between the unipolar signals (e.g., between the local activation times (LATs) of the unipolar signals) of an electrode pair is indicative of the alignment of that electrode pair with the direction of propagation of the electrical activation signals. When examining neighboring electrodes, a larger time difference is generally indicative of being more aligned with the direction of propagation. For example, with a grid shaped catheter including multiple splines, a first electrode pair may include two adjacent electrodes (e.g., A1 and A2) on the same spline (e.g., spline A) of the catheter, and a second electrode pair may include electrodes (e.g., A1 and B1) on different splines of the catheter (e.g., on spline A and spline B, respectively). The time difference between the LATs of the unipolar signals of electrodes A1 and A2 is computed and is equal to $\Delta t1$. The time difference between the LATs of the unipolar signals of electrodes A1 and B1 is computed and is equal to $\Delta t2$. A greater time difference indicates better alignment with the electrical activation wave propagation direction, as it takes longer for the wave front of the wave to reach the second electrode in the pair. Therefore, if $\Delta t1$ is greater than $\Delta t2$, then electrode pair A1-A2 is selected and the bipolar signal of electrode pair A1-A2 is acquired into the electro-anatomical map. If $\Delta t2$ is greater than $\Delta t1$, then electrode pair A1-B1 is selected and the bipolar signal of electrode pair A1-B1 is acquired into the electro-anatomical map.

An electrode may be paired with any suitable neighbor to find the electrode pair that is better aligned with the direction of propagation. For example, if a catheter has six splines (referred to as splines A-F) with 6 or more electrodes per spline, an electrode C5 may be paired with any of the following to determine which electrode pair provides a better alignment with the direction of propagation: C4, C6, B4, B5, B6, D4, D5, and D6 etc.

It should be noted that a number of electrode pairs from the catheter may be selected to provide bipolar signals for the electro-anatomical map even while the catheter is in the same position in the chamber of the heart. For example, electrode pair A1-A2 and electrode pair A2-A3 etc. may be selected to provide bipolar signals for the electro-anatomical map. Typically, if the catheter includes X electrodes, then about up to X electrode pairs may be selected to provide bipolar signals. The exact configuration of the X electrode pairs to be selected for providing bipolar signals into the map depends on the time difference between the LATs of the unipolar signals of the different available combinations of electrode pairs. For example, in a grid-shaped catheter, each electrode may potentially be paired with between three and eight neighboring electrodes depending on the position of the electrode in grid-shaped distal end assembly and the configuration of the grid.

In some embodiments, the catheter includes a distal end assembly with a grid configuration, whereas in other embodiments, the distal end assembly may be any suitable shape or configuration with any suitable number of splines, for example, a lasso catheter, a basket catheter, or a catheter with multiple flexible splines that are connected to the shaft at one end and not restricted at the other end such as a Pentaray™ catheter commercially available from Biosense Webster Inc., Irvine, Calif. Depending on the catheter configuration, two or more electrodes (e.g., from different splines) may touch the same tissue at a given time. In this case, each of the two (or more) electrodes may be paired with any suitable neighbor (or neighbors) to find the electrode pair that is better aligned with the direction of propagation.

In some embodiments, where the catheter is moved around in the chamber of the heart, a first electrode pair may initially be selected for a certain tissue position in the chamber to provide bipolar signals for the electro-anatomical map based on this first electrode pair being best aligned with the electrical activation wave propagation direction at that tissue position. Subsequently, as the catheter is moved to a new position, either the same portion of the catheter (e.g., with a different orientation) or another portion of the catheter may now be located at same tissue position (or within a given threshold of that position). The timing of the unipolar signals of electrode pairs at the new catheter position may be analyzed to determine if one of the electrode pairs at the new position are better aligned with the electrical activation wave propagation direction than the first electrode pair. If a second electrode pair at the new position is better aligned with the electrical activation wave propagation direction than the first electrode pair, the data captured into the electro-anatomical map from the first electrode pair may then be replaced by data from the second electrode pair.

System Description

Figure 1:
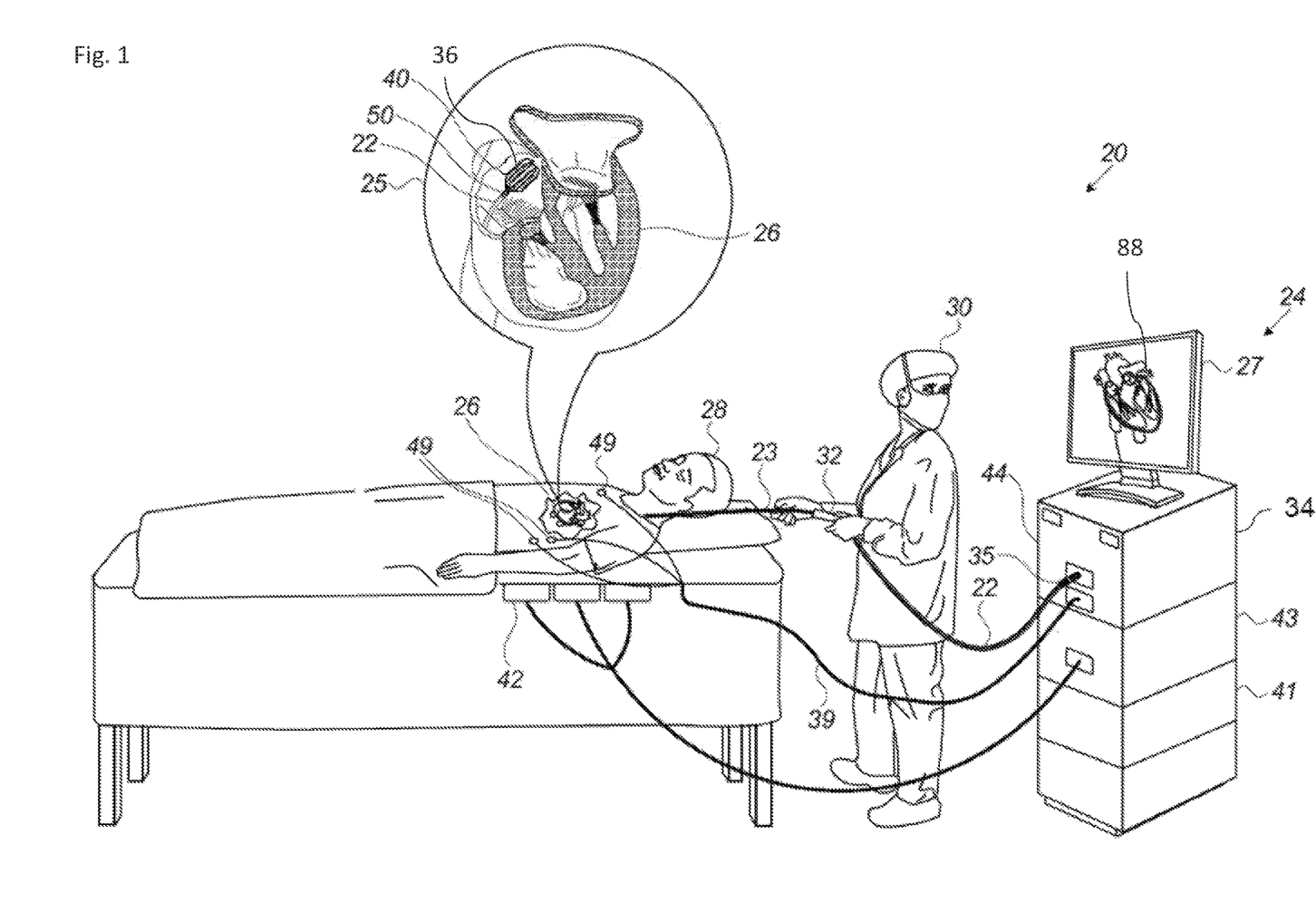
FIG. 1 is a schematic view of a medical procedure system constructed and operative in accordance with an exemplary embodiment of the present invention.
Figure 2A:
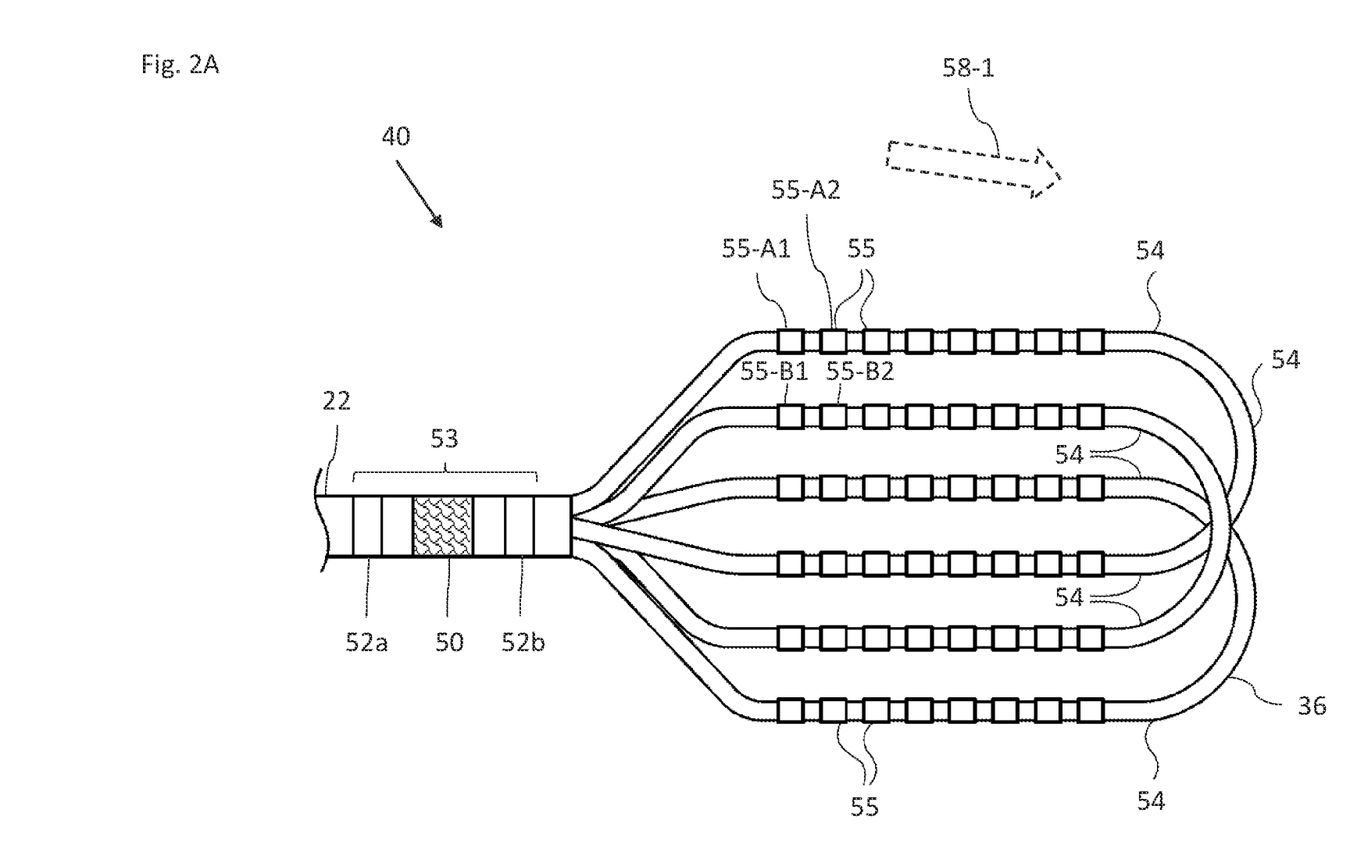
FIGS. 2A-C are schematic views of a catheter for use in the system of FIG. 1 and electrical activation signals propagating in different directions with respect to the catheter.

Reference is now made to FIG. 1, which is a schematic view of a medical procedure system 20 constructed and operative in accordance with an embodiment of the present invention. Reference is also made to FIG. 2A, which is a schematic view of a catheter 40 for use in the system 20 of FIG. 1.

The medical procedure system 20 is used to determine the position of the catheter 40, seen in an inset 25 of FIG. 1 and in more detail in FIG. 2A. The catheter 40 includes a shaft 22, a grid-shaped distal end assembly 36, which comprises a plurality of flexible splines 54 and multiple electrodes 55 (only some labeled for the sake of simplicity). The flexible splines 54 are connected to the shaft 22 at their proximal end, and loop over each other at their distal end. Respective groups of the multiple electrodes 55 are disposed on respective ones of the flexible splines 54. The distal end assembly 36 is described by way of example only. In some embodiments, the distal end assembly may be any suitable shape or configuration with any suitable number of splines, for example, a lasso catheter, a basket catheter, or a catheter with multiple flexible splines that are connected to the shaft at one end and not restricted at the other end such as a Pentaray™ catheter commercially available from Biosense Webster Inc., Irvine, Calif.

The catheter 40 is configured to be inserted into a chamber of a heart 26 of a living subject (e.g., a patient 28). The electrodes 55 are configured to capture electrical activity from electrical activation signals propagating in tissue of the chamber. Typically, the catheter 40 may be used for mapping electrical activity in the heart 26 of the living subject using the electrodes 55.

The catheter 40 includes a position sensor 53 disposed on the shaft 22 in a predefined spatial relation to the proximal ends of the flexible splines 54. The position sensor 53 may include a magnetic sensor 50 and/or at least one shaft electrode 52. The magnetic sensor 50 may include at least one coil, for example, but not limited to, a dual-axis or a triple axis coil arrangement to provide position data for location and orientation including roll.

The medical procedure system 20 may determine a position and orientation of the shaft 22 of the catheter 40 based on signals provided by the magnetic sensor 50 and/or the shaft electrodes 52 (proximal-electrode 52a and distal-electrode 52b) fitted on the shaft 22, on either side of the magnetic sensor 50. The proximal-electrode 52a, the distal-electrode 52b, the magnetic sensor 50 and at least some of the electrodes 55 are connected by wires running through the shaft 22 via a catheter connector 35 to various driver circuitries in a console 24. In some embodiments, at least some of the electrodes 55 of each of the flexible splines 54, the shaft electrodes 52, and the magnetic sensor 50 are connected to the driver circuitries in the console 24 via the catheter connector 35. In some embodiments, the distal electrode 52b and/or the proximal electrode 52a may be omitted.

The illustration shown in FIG. 2A is chosen purely for the sake of conceptual clarity. Other configurations of shaft electrodes 52 and electrodes 55 are possible. Additional functionalities may be included in the position sensor 53. Elements which are not relevant to the disclosed embodiments of the invention, such as irrigation ports, are omitted for the sake of clarity.

A physician 30 navigates the catheter 40 to a target location in a body part (e.g., the heart 26) of the patient 28 by manipulating the shaft 22 using a manipulator 32 near the proximal end of the catheter 40 and/or deflection from a sheath 23. The catheter 40 is inserted through the sheath 23, with the flexible splines 54 gathered together, and only after the catheter 40 is retracted from the sheath 23, the flexible splines 54 are able to spread and regain their intended functional shape. By containing flexible splines 54 together, the sheath 23 also serves to minimize vascular trauma on its way to the target location.

Console 24 comprises processing circuitry 41, typically a general-purpose computer and a suitable front end and interface circuits 44 for generating signals in, and/or receiving signals from, body surface electrodes 49 which are attached by wires running through a cable 39 to the chest and to the back, or any other suitable skin surface, of the patient 28.

Console 24 further comprises a magnetic-sensing subsystem. The patient 28 is placed in a magnetic field generated by a pad containing at least one magnetic field radiator 42, which is driven by a unit 43 disposed in the console 24. The magnetic field radiator(s) 42 is configured to transmit alternating magnetic fields into a region where the body-part (e.g., the heart 26) is located. The magnetic fields generated by the magnetic field radiator(s) 42 generate direction signals in the magnetic sensor 50. The magnetic sensor 50 is configured to detect at least part of the transmitted alternating magnetic fields and provide the direction signals as corresponding electrical inputs to the processing circuitry 41.

In some embodiments, the processing circuitry 41 uses position-signals received from the shaft electrodes 52, the magnetic sensor 50 and the electrodes 55 to estimate a position of the catheter 40 inside an organ, such as inside a cardiac chamber. In some embodiments, the processing circuitry 41 correlates the position signals received from the electrodes 52, 55 with previously acquired magnetic location-calibrated position signals, to estimate the position of the catheter 40 inside a cardiac chamber. The position coordinates of the shaft electrodes 52 and the electrodes 55 may be determined by the processing circuitry 41 based on, among other inputs, measured impedances, or on proportions of currents distribution, between the electrodes 52, 55 and the body surface electrodes 49. The console 24 drives a display 27, which shows the distal end of the catheter 40 inside the heart 26 and optionally an electro-anatomical map 88.

The method of position sensing using current distribution measurements and/or external magnetic fields is implemented in various medical applications, for example, in the Carto® system, produced by Biosense Webster Inc. (Irvine, Calif.), and is described in detail in U.S. Pat. Nos. 5,391,199, 6,690,963, 6,484,118, 6,239,724, 6,618,612, 6,332,089, 7,756,576, 7,869,865, and 7,848,787, in PCT Patent Publication WO 96/05768, and in U.S. Patent Application Publications 2002/0065455 A1, 2003/0120150 A1 and 2004/0068178 A1.

The Carto®3 system applies an Active Current Location (ACL) impedance-based position-tracking method. In some embodiments, using the ACL method, the processing circuitry 41 is configured to create a mapping (e.g., current-position matrix (CPM)) between indications of electrical impedance and positions in a magnetic coordinate frame of the magnetic field radiator(s) 42. The processing circuitry 41 estimates the positions of the shaft electrodes 52 and the electrodes 55 by performing a lookup in the CPM.

Processing circuitry 41 is typically programmed in software to carry out the functions described herein. The software may be downloaded to the computer in electronic form, over a network, for example, or it may, alternatively or additionally, be provided and/or stored on non-transitory tangible media, such as magnetic, optical, or electronic memory.

FIG. 1 shows only elements related to the disclosed techniques, for the sake of simplicity and clarity. The system 20 typically comprises additional modules and elements that are not directly related to the disclosed techniques, and thus are intentionally omitted from FIG. 1 and from the corresponding description.

The medical procedure system 20 may also perform ablation of heart tissue using any suitable catheter, for example using the catheter 40 or a different catheter and any suitable ablation method. The console 24 may include an RF signal generator 34 configured to generate RF power to be applied by an electrode or electrodes of a catheter connected to the console 24, and one or more of the body surface electrodes 49, to ablate a myocardium of the heart 26. The console 24 may include a pump (not shown), which pumps irrigation fluid through an irrigation channel to a distal end of a catheter performing ablation. The catheter performing the ablation may also include temperature sensors (not shown) which are used to measure a temperature of the myocardium during ablation and regulate an ablation power and/or an irrigation rate of the pumping of the irrigation fluid according to the measured temperature.

Figure 2B:
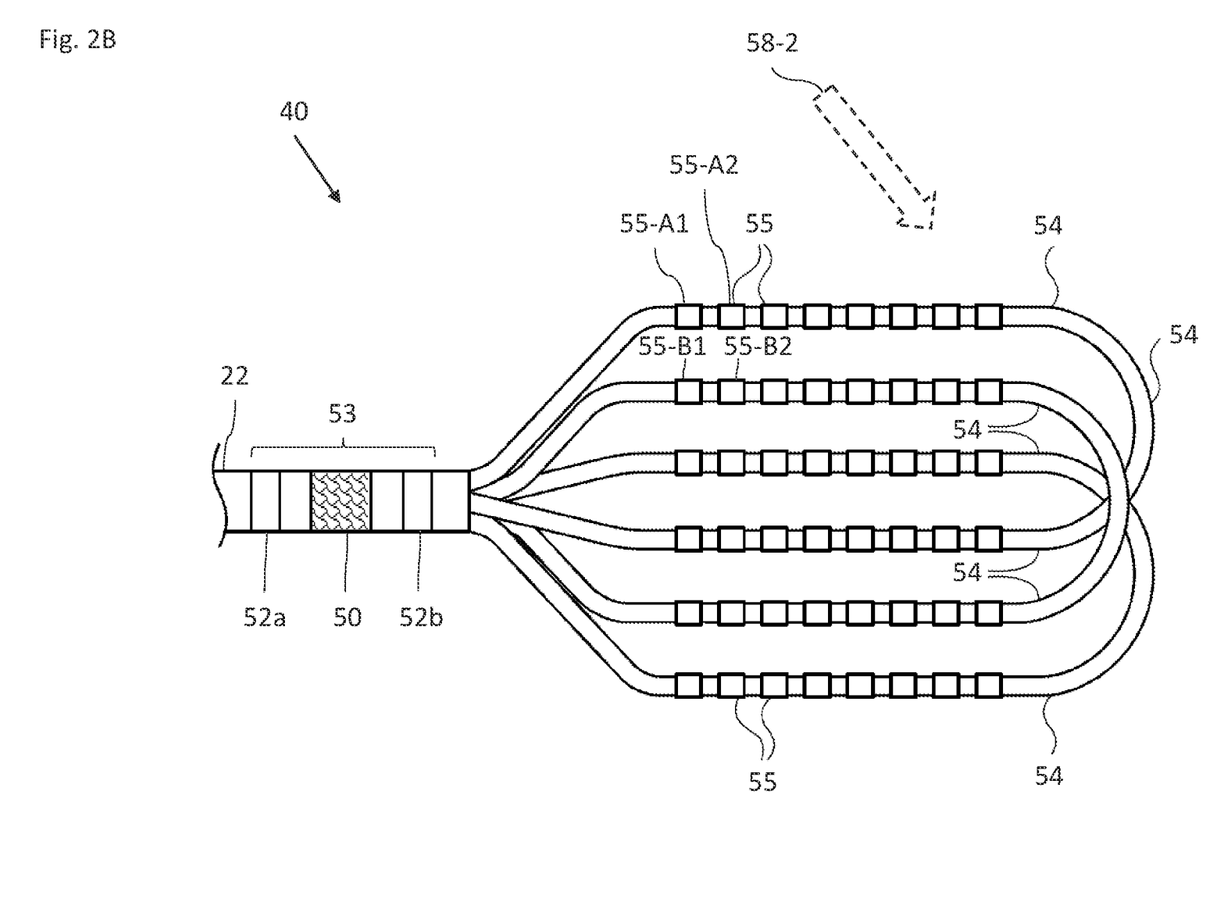
Figure 2C:
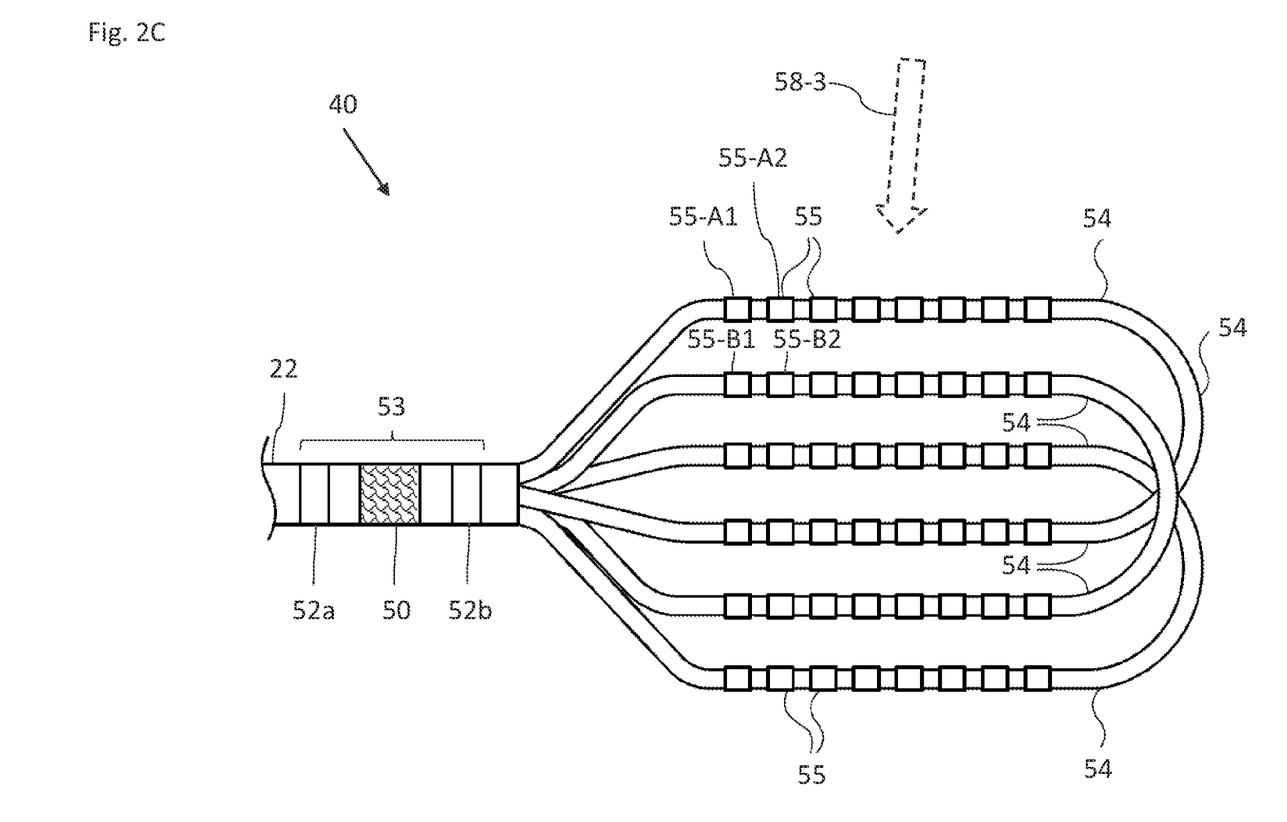

Reference is now made to FIGS. 2A-C, which are schematic views of the catheter 40 for use in the system 20 of FIG. 1 and electrical activation signals propagating in respective directions 58 with respect to the catheter 40. In the examples of FIGS. 2A-C, different electrode pairs paired with electrode 55-A1 are considered. Electrode 55-A1 may be pair with electrode 55-A2 (on the same spline, i.e., spline A), or with electrode 55-B1 (on a different spline, i.e., on spline B), or with electrode 55-B2 (on spline B, at a diagonal to electrode 55-A1 on the grid-shaped distal end assembly 36).

It can be seen in FIG. 2A, that the electrode pair comprising electrode 55-A1 and electrode 55-A2 is better aligned with the direction of propagation 58-1 than the electrode pair including electrode 55-A1 and electrode 55-B1 or the electrode pair including electrode 55-A1 and electrode 55-B2.

It can be seen in FIG. 2B, that the electrode pair comprising electrode 55-A1 and electrode 55-B2 is better aligned with the direction of propagation 58-2 than the electrode pair including electrode 55-A1 and electrode 55-A2 or the electrode pair including electrode 55-A1 and electrode 55-B1.

It can be seen in FIG. 2C, that the electrode pair comprising electrode 55-A1 and electrode 55-B1 is better aligned with the direction of propagation 58-3 than the electrode pair including electrode 55-A1 and electrode 55-A2 or the electrode pair including electrode 55-A1 and electrode 55-B2.

Figure 3A:
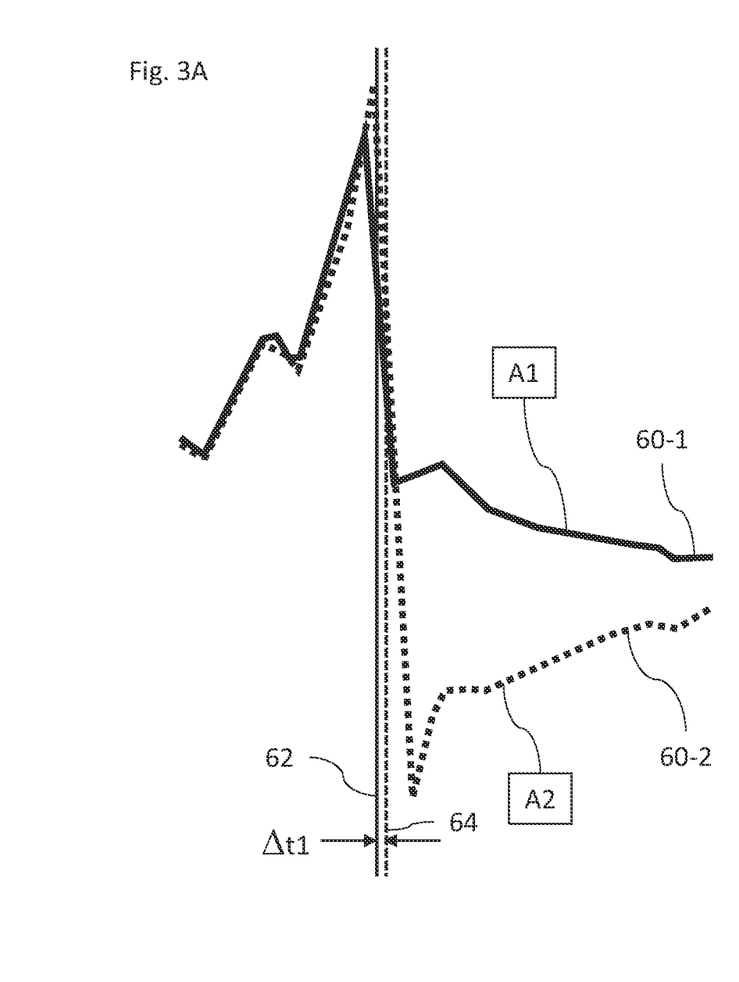
FIGS. 3A-B are schematic views of unipolar signals of different electrode pairs illustrating the time differences between local activation times of the unipolar signals of the different electrode pairs.
Figure 3B:
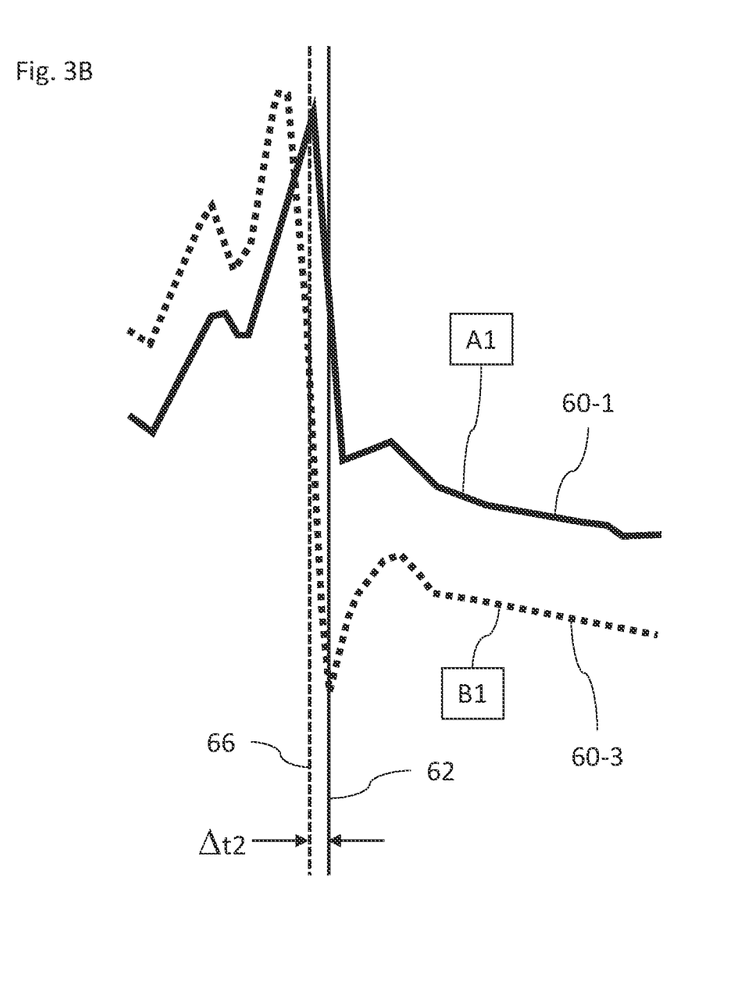

Reference is now made to FIGS. 3A-B, which are schematic views of unipolar signals 60 of different electrode pairs illustrating the time differences between local activation times of the unipolar signals 60 of the different electrode pairs. The unipolar signals 60 shown in FIGS. 3A-B are based on the assumption that the electrical activation signals are propagating in the direction of propagation 58-3 as shown in FIG. 2C. FIG. 3A shows the unipolar signals 60 of electrode pair 55-A1 and 55-A2. FIG. 3B shows the unipolar signals 60 of electrode pair 55-A1 and 55-B1.

In FIG. 3A, a solid line 62 marks the LAT of a unipolar signal 60-1 captured by electrode 55-A1, and a dotted line 64 marks the LAT of a unipolar signal 60-2 captured by electrode 55-A2. The LAT of signal 60-2 is in advance of the LAT of signal 60-1. The time difference $\Delta t1$ between the LAT of unipolar signal 60-1 and the LAT of unipolar signal 60-2 is shown as the difference between solid line 62 and dotted line 64.

In FIG. 3B, the solid line 62 marks the LAT of the unipolar signal 60-1 captured by electrode 55-A1, and a dotted line 66 marks the LAT of a unipolar signal 60-3 captured by electrode 55-B1. The LAT of signal 60-1 is in advance of the LAT of signal 60-3. The time difference $\Delta t2$ between the LAT of unipolar signal 60-1 and the LAT of unipolar signal 60-3 is shown as the difference between solid line 62 and dotted line 66.

It can be seen that $\Delta t2$ is greater than $\Delta t1$, and therefore the electrode pair including electrode 55-A1 and electrode 55-B1 is better aligned with the direction 58-3 of propagation (shown in FIG. 3C) than the electrode pair including electrode 55-A1 and electrode 55-A2. Therefore, the electrode pair including electrode 55-A1 and electrode 55-B1 is selected for acquiring bipolar signals into the electro-anatomical map.

Therefore, in general, the processing circuitry 41 (FIG. 1) is configured to automatically select, for a time period, the bipolar signals to be captured into the electro-anatomical map from a first electrode pair (with a time difference $\Delta t1$ between the LATs of the unipolar signals of the first electrode pair) and not from a second electrode pair (with a time difference $\Delta t2$ between the LATs of the unipolar signals of the second electrode pair) responsively to the time difference $\Delta t1$ being greater than the time difference $\Delta t2$.

Therefore, in some cases, the selected electrode pair providing bipolar signals may include electrodes 55 that are disposed on different flexible splines 54, while unselected electrode pair(s) may be on the same spline 54. In other cases, the selected electrode pair providing bipolar signals may include electrodes 55 that are disposed on the same flexible spline 54, while unselected electrode pair(s) may be on different splines 54.

Figure 4:
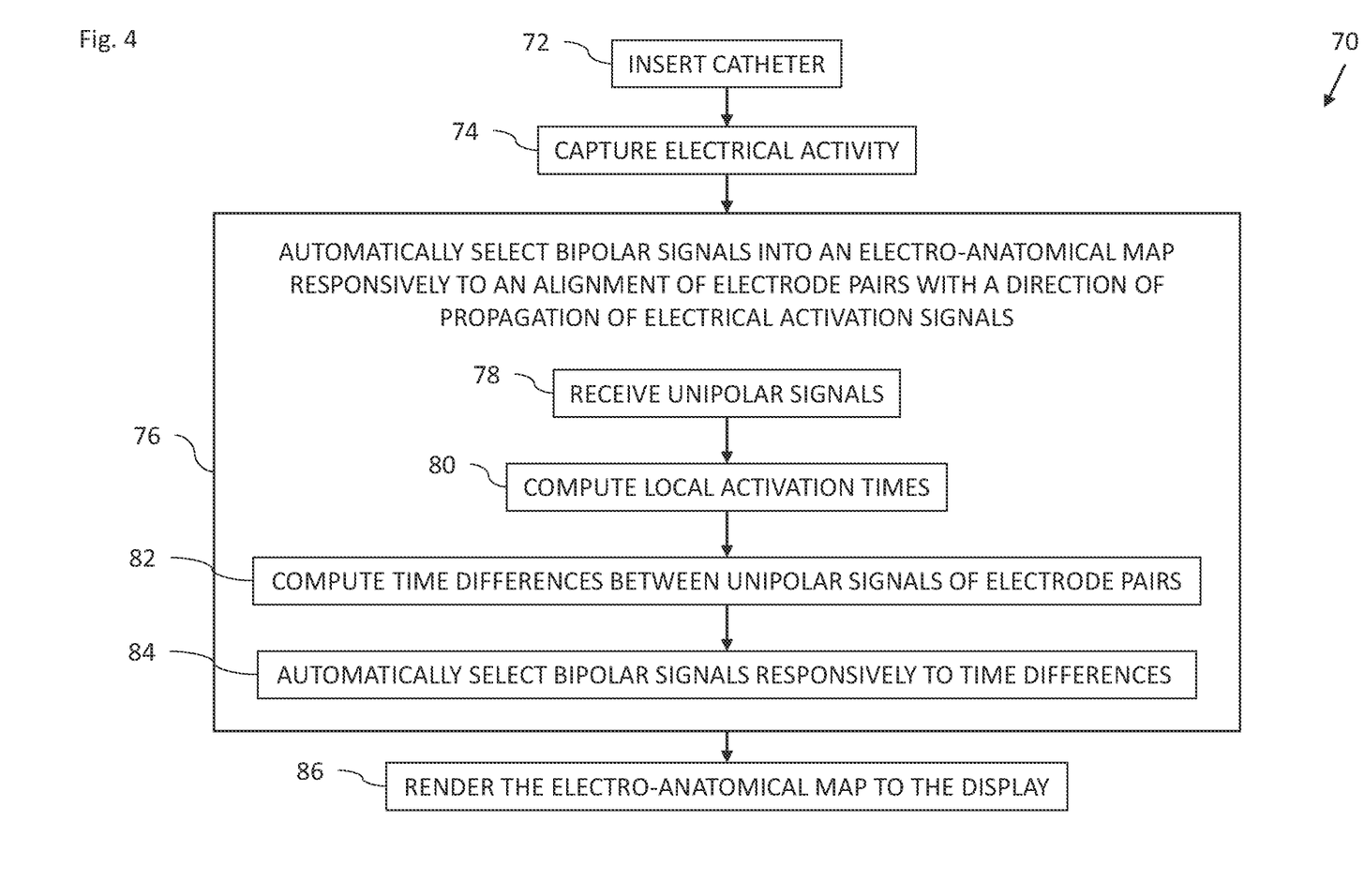
FIG. 4 is a flowchart including steps in a method of operation of the system of FIG. 1.

Reference is now made to FIG. 4, which is a flowchart 70 including steps in a method of operation of the system 20 of FIG. 1.

The catheter 40 is inserted (block 72) into a chamber of the heart 26 (FIG. 1). The electrodes 55 of the catheter 40 capture (block 74) electrical activity of tissue of the chamber.

The processing circuitry 41 is configured to automatically select (block 76) bipolar signals to be captured into the electro-anatomical map 88 (FIG. 1) from a selection of respective electrode pairs of the multiple electrodes 55 responsively to an alignment of the respective electrode pairs with a direction 58 of propagation of the electrical activation signals. Sub-steps of the step of block 76 are now described with reference to blocks 78-84.

The processing circuitry 41 is configured to receive (block 78) unipolar signals 60 from respective ones of the multiple electrodes 55. In some embodiments, the processing circuitry 41 is configured to compute (block 80) respective local activation times for the unipolar signals 60. In some embodiments, the processing circuitry 41 is configured to compute the respective local activation times for the unipolar signals 60 responsively to a respective maximum negative slope of the unipolar signals 60. Any suitable method of computing the LATs may be used.

The processing circuitry 41 is configured to compute (block 82), for the respective electrode pairs, respective time differences between the unipolar signals 60 of the respective electrode pairs (i.e., compute a time difference between the unipolar signals 60 of each electrode pair). The respective time differences are indicative of respective alignments of the respective electrode pairs with the direction 58 of propagation of the electrical activation signals.

In some embodiments, the processing circuitry 41 is configured to compute, for the respective electrode pairs, the respective time differences between the unipolar signals 60 of the respective electrode pairs responsively to the respective local activation times. In other words, the time difference between the unipolar signals 60 of each electrode pair is computed based on the difference between the LATs of the unipolar signals 60 of that electrode pair.

The processing circuitry 41 is configured to automatically select (block 84) the bipolar signals to be captured into the electro-anatomical map from the respective electrode pairs responsively to the respective time differences between (the LATs of) the unipolar signals 60 of the respective electrode pairs. Typically, given a selection of time differences between the unipolar signals 60 of the respective electrode pairs, the electrode pair(s) with the highest time difference(s) is/(are) selected to provide the bipolar signals. It should be noted that a number of electrode pairs may be selected to provide bipolar signals for the electro-anatomical map 88 even while the catheter 40 is in the same position in the chamber of the heart 26. For example, electrode pair A1-A2 and electrode pair A2-A3 etc. may be selected to provide bipolar signals for the electro-anatomical map 88. Typically, if the catheter 40 includes X electrodes, then about up to X electrode pairs may be selected to provide bipolar signals. The exact configuration of the X electrode pairs to be selected for providing bipolar signals into the map depends on the time difference between the LATs of the unipolar signals of the different available combinations of electrode pairs. For example, in the catheter 40, each electrode 55 may potentially be paired between three and eight neighboring electrodes 55 depending on the position of the electrode in grid-shaped distal end assembly 36 and the configuration of the electrodes in the grid.

The processing circuitry 41 is configured to render (block 86) the electro-anatomical map 88 to the display 27 as shown in FIG. 1.

As used herein, the terms "about" or "approximately" for any numerical values or ranges indicate a suitable dimensional tolerance that allows the part or collection of components to function for its intended purpose as described herein. More specifically, "about" or "approximately" may refer to the range of values ±20% of the recited value, e.g., "about 90%" may refer to the range of values from 72% to 108%.

Various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

The embodiments described above are cited by way of example, and the present invention is not limited by what has been particularly shown and described hereinabove. Rather the scope of the invention includes both combinations and sub-combinations of the various features described hereinabove, as well as variations and modifications thereof which would occur to persons skilled in the art upon reading the foregoing description and which are not disclosed in the prior art.

What is claimed is:

1. A medical system for electrode pair selection, the system comprising:
a catheter configured to be inserted into a chamber of a heart of a living subject and to capture electrical activity from electrical activation signals propagating in tissue of the chamber;
a display; and
processing circuitry configured to:
for a given period, receive unipolar signals from each electrode of a first pair of electrodes and each electrode of a second pair of electrodes mounted upon a portion of the catheter configured to contact tissue of the heart,
compute a first time difference between the unipolar signals of the electrodes of the first pair of electrodes and a second time difference between the unipolar signals of the second pair of electrodes;
determine that the first pair of electrodes is in closer alignment with a direction of propagation of an electrical activation wave at a location in the heart than the second pair of electrodes based on a comparison of the first time difference to the second time difference; and
automatically select, for the given time period, a bipolar signal to be captured into an electro-anatomical map for the location from the first pair of electrodes and not from the second pair of electrodes based on the first time difference being greater than the second time difference.

2. The system according to claim 1, wherein the processing circuitry is configured to:
compute respective local activation times for the unipolar signals; and
compute, for the first pair of electrodes and the second pair of electrodes, the respective first time difference and second time difference between the unipolar signals of the first pair of electrodes and the second pair of electrodes responsively to the respective local activation times.

3. The system according to claim 2, wherein the processing circuitry is configured to compute the respective local activation times for the unipolar signals responsively to a respective maximum negative slope of the unipolar signals.

4. The system according to claim 1, wherein:
the catheter includes a plurality of flexible splines, each electrode of the first pair of electrodes and the second pair of electrodes being disposed on the flexible splines,
the electrodes of the first pair of electrodes are disposed on different ones of the flexible splines; and
the electrodes of the second pair of electrodes are disposed on a same one of the flexible splines.

5. The system according to claim 4, wherein the catheter includes a grid-shaped distal end assembly comprising the flexible splines.

6. A medical method for electrode pair selection, the method comprising:
for a given time period, receiving unipolar signals from electrodes of a first pair of electrodes and a second pair of electrodes of a catheter inserted into a chamber of a heart of a living subject,
computing a first time difference between the unipolar signals of the electrodes of the first pair of electrodes and a second time difference between the unipolar signals of the second pair of electrodes;
determining that the first pair of electrodes is in closer alignment with a direction of propagation of an electrical activation wave at a location in the heart than the second pair of electrodes based on a comparison of the first time difference to the second time difference; and
automatically selecting, for the given time period, a bipolar signal to be captured into an electro-anatomical map for the location from the first electrode pair and not from the second electrode pair based on the first time difference being greater than the second time difference.

7. The method according to claim 6, further comprising computing respective local activation times for the unipolar signals, wherein the computing the respective first time difference and second time difference between the unipolar signals of the first pair of electrodes and the second pair of electrodes is performed responsively to the respective local activation times.

8. The method according to claim 7, wherein the computing the respective local activation times for the onipolar signals is performed responsively to a respective maximum negative slope of the unipolar signals.

9. The method according to claim 6, wherein:
the catheter includes a plurality of flexible splines, each electrode of the first pair of electrodes and the second pair of electrodes being disposed on the flexible splines;
the electrodes of the first pair of electrodes are disposed on different ones of the flexible splines; and
the electrodes of the second pair of electrodes are disposed on a same one of the flexible splines.

10. The method according to claim 9, wherein the catheter includes a grid-shaped distal end assembly comprising the flexible splines.

11. A software product, comprising a non-transient computer-readable medium in which program instructions are stored, which instructions, when read by a central processing unit (CPU), cause the CPU to:
for a given period, receive unipolar signals from electrodes of a first pair of electrodes and a second pair of electrodes of a catheter inserted into a chamber of a heart of a living subject;
compute a first time difference between the unipolar signals of the electrodes of the first pair of electrodes and a second time difference between the unipolar signals of the second pair of electrodes;
determine that the first electrode pair is in closer alignment with a direction of propagation of an electrical activation wave at a location in the heart than the second electrode pair based on a comparison of the first time difference to the second time difference; and
automatically select, for the given time period, a bipolar signal to be captured into an electro-anatomical map for the location from the first electrode pair and not from the second electrode pair, based on the first time difference being greater than the second time difference.

* * * * *